United States Patent Office 2,971,973
Patented Feb. 14, 1961

2,971,973

N-BENZHYDRYL-O-ALKYLPSEUDOUREAS AND THEIR SALTS

Stanley O. Winthrop, Montreal, Quebec, Canada, assignor to American Home Products Corporation, New York, N.Y., a corporation of Delaware No Drawing. Filed July 17, 1957, Ser. No. 672,371

9 Claims. (Cl. 260—453)

This invention relates to certain new chemical compounds, the N-benzhydryl-O-alkylpseudoureas and their salts. It is also directed to the novel procedure by which these chemical compounds may be prepared.

These new chemical compounds are therapeutically active, being useful as stimulants of the central nervous system, as analeptics, as anorexics, and for similar purposes.

The new chemical compounds with which this invention is concerned may be represented in free base form by the structural formula

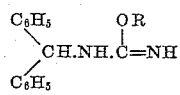

where R is a lower alkyl radical. In the form of their acid addition salts, more particularly their hydrohalides, the new compounds prepared in accordance with my invention may be represented as

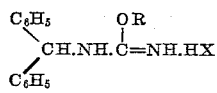

wherein R represents, as before, lower alkyl and HX represents a hydrohalogen acid such as hydrochloric acid, hydrobromic acid or hydroiodic acid. In both structural formulas that portion thereof designated as

represents the benzhydryl radical.

In preparing the novel compounds it is possible to start with benzhydrylamine and a cyanogen halide, utilizing a process which may be diagrammatically represented as follows:

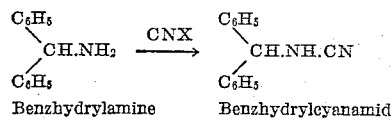
Benzhydrylamine        Benzhydrylcyanamide

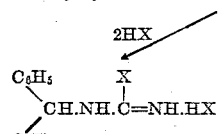

N-benzhydrylhaloformamidine hydrohalide

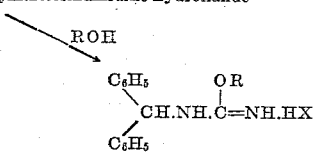

N-benzhydryl-O-alkylpseudourea hydrohalide

In this series of three chemical reactions to yield a hydrohalide addition salt of the desired N-benzhydryl-O-alkylpseudourea base, X represents a halogen and R represents lower alkyl, the symbol ROH representing any lower alkanol (straight or branched chain).

When preparing the free bases or other acid addition salts of the N-benzhydryl-O-alkylpseudoureas from the hydrohalide salt prepared in accordance with the series of chemical reactions indicated, the following procedure may be followed:

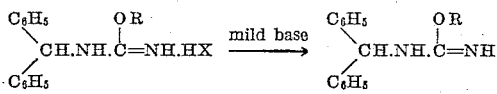

Treatment of the hydrohalide salt with a mild base, such for example as sodium methylate or other alkali metal methylate, results in the free N-benzhydryl-O-alkylpseudourea base. As previously indicated, R in the above represents lower alkyl.

The free base may then be converted to an acid addition salt thereof by treatment with an acid, such as a hydrohalogen acid, for example, in which case the product may be represented as

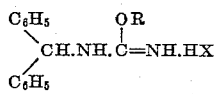

wherein X represents a halogen.

Organic acid salts of the free bases may also be prepared in this way.

Certain of the intermediate chemical compounds prepared by following this method of preparation, more especially benzhydrylcyanamide and the N-benzhydrylhaloformamidines and their hydrohalides, are also new chemical compounds. Such compounds as the novel benzhydrylcyanamide, and N-benzhydrylchloroformamidine hydrochloride, therefore also constitute part of my invention. (The latter compound may also be named simply N-benzhydrylcyanamide dihydrochloride.)

The following examples illustrate my invention.

EXAMPLE 1

*N-benzhydrylcyanamide*

40 grams (0.375 mole) of cyanogen bromide was dissolved in 250 milliliters of ethylacetate. The resulting solution was added dropwise, with stirring and cooling, to 117 grams (0.75 mole) of benzhydrylamine dissolved in 750 milliliters of ethylacetate.

When the addition was complete and the exothermic reaction had subsided, the reaction mixture was heated and refluxed for an additional hour. Benzhydrylamine hydrobromide precipitated in the reaction mixture and was removed by filtration. The clear ethylacetate solution was then evaporated down in vacuo, at a pressure below atmospheric, leaving behind a solid residue which was N-benzhydrylcyanamide.

This crude product was purified by dissolving it in a solution containing 500 milliliters of ethanol and 2500 milliliters of 0.5 percent sodium hydroxide solution. The solution was boiled for a few minutes, filtered to remove insoluble impurities, and neutralized with glacial acetic acid. The white solid product which precipitated melted at 119–121° C. and the yield was 35 grams. On recrystallization from a solution of the product in benzene-hexane, a crystalline product melting at 121–122° C. was secured. This crystalline product was substantially pure N-benzhydrylcyanamide of the empiric formula $$C_{14}H_{12}N_2$$

Calculated: C, 80.72; H, 5.82; N, 13.46. Found: C, 80.35; H, 5.78; N, 13.13, 13.15.

EXAMPLE 2

N-benzhydrylchloroformamidine hydrochloride 20.8 grams (0.1 mole) of N-benzhydrylcyanamide was dissolved in approximately 600 milliliters of ether and an excess amount of hydrogen chloride dissolved in ether was then added thereto. The precipitated hydrochloride was filtered off and dried to yield 26 grams of a solid product melting at 178–180° C. (dec.). Upon recrystallization from a solution in acetonitrile, the melting point of the product was raised to 180–181° C. (dec.). The product was substantially pure N-benzhydrylchloroformamidine hydrochloride (also called N-benzhydrylcyanamide dihydrochloride) of empiric formula $$C_{14}H_{14}N_2Cl_2$$

Calculated: N, 9.97; Cl, 25.25. Found: N, 10.23; Cl, 25.35, 25.43.

EXAMPLE 3

N-benzhydryl-O-methylpseudourea hydrochloride 10 grams of N-benzhydrylchloroformamidine hydrochloride was refluxed for 30 minutes in 100 milliliters of methanol and the solution was then allowed to stand overnight. The methanol was then removed by evaporation in vacuo at a pressure less than atmospheric and the oily residue which remained was crystallized from an acetone-ether mixture. This resulted in 6.7 grams of a solid product melting at 124–125° C. (dec.). Upon recrystallization from methanol-ether the melting point did not change. The product was N-benzhydryl-O-methylpseudourea hydrochloride and analysis confirmed the empiric formula $C_{15}H_{17}N_2OCl$.

Calculated: N, 10.12; Cl, 12.81. Found: N, 9.95, 9.84; Cl, 12.81, 13.02

EXAMPLE 4

N-benzhydryl-O-methylpseudourea

The free base, N-benzhydryl-O-methylpseudourea, was prepared from the hydrochloride by the following process.

2.8 grams (0.01 mole) of N-benzhydryl-O-methylpseudourea hydrochloride was added to 50 milliliters of methanol containing 0.59 grams (0.011 mole) of sodium methylate. Ether was then added to secure complete precipitation of the formed sodium chloride, which was then removed by filtration. The clear filtrate was evaporated down in vacuo at a pressure below atmospheric to yield 20 grams of a solid product melting at 101–104° C. This was a free base and, upon recrystallization from hexane solution, the melting point of the substantially pure product was found to be 105–107° C. It had the empiric formula $C_{15}H_{16}N_2O$.

Calculated: C, 74.85; H, 6.71; N, 11.64. Found: C, 75.04; H, 6.61; N, 11.95, 11.86.

EXAMPLE 5

Salts of N-benzhydryl-O-methylpseudourea

The hydrobromide, the hydroiodide and maleate acid addition salts of N-benzhydryl-O-methylpseudourea were prepared by the following procedure.

In each case the free base was dissolved in ether and a slight excess of the desired acid in a suitable solvent was added to the ethereal solution of the base. Thus, an ether solution of hydrobromic acid, of hydroiodic acid and of maleic acid were all separately added, in each case, to a portion of the clear solution of N-benzhydryl-O-methylpseudourea in ether. In each case the desired salt precipitated, and it was filtered off, dried, and recrystallized once from a methanol-ether solution to yield the analytically pure product.

The following acid addition salts were secured by this procedure:

(1) The hydrobromide salt of empiric formula $$C_{15}H_{17}N_2OBr$$

This compound melted at 122–123° C. (dec.).

(2) The hydroiodide salt of empiric formula $$C_{15}H_{17}N_2OI$$

This compound melted at 117–118° C. (dec.).

(3) The maleate of empiric formula $C_{19}H_{20}N_2O_5$. This compound melted at 157–158° C. (dec.).

EXAMPLE 6

N-benzhydryl-O-ethylpseudourea hydrochloride

This compound was prepared by the same procedure followed in the preparation of the O-methyl homologue as described in Example 3.

6.7 grams (0.027 mole) of N-benzhydrylchloroformamidine hydrochloride was refluxed for 30 minutes in 100 milliliters of ethanol and the solution allowed to stand overnight. The ethanol was then removed by evaporation in vacuo at a reduced pressure less than atmospheric and the oily residue crystallized from acetone-ether mixture. This yielded 5.5 grams of the solid product, N-benzhydryl-O-ethylpseudourea hydrochloride. Three recrystallizations from ethanol-ether solution resulted in the substantially pure crystalline compound melting at 130–131° C. (dec.). Analysis confirmed the empiric formula $C_{16}H_{19}N_2OCl$.

EXAMPLE 7

N-benzhydryl-O-isopropylpseudourea hydrochloride

By following the same procedure described in Example 3 and by refluxing 2 grams of N-benzhydryl chloroformamidine hydrochloride in isopropanol (instead of methanol) there was obtained 1.2 grams of solid product melting at 136–138° C. (dec.). This product was N-benzhydryl-O-isopropylpseudourea hydrochloride. Upon recrystallization from isopropanol-ether solution the melting point of the recrystallized product remained at 136–138° C. (dec.). It analyzed correctly for the empiric formula $C_{17}H_{21}N_2OCl$.

I claim:

1. A compound selected from the group which consists of free bases of the formula

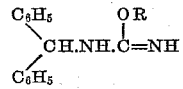

where R represents lower alkyl, and the hydrohalide and maleate salts of said bases.

2. A compound of the formula

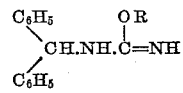

where R represents lower alkyl.

3. N-benzhydryl-O-methylpseudourea.
4. N-benzhydryl-O-methylpseudourea hydrochloride.
5. N-benzhydryl-O-methylpseudourea hydrobromide.
6. N-benzhydryl-O-methylpseudourea hydroiodide.
7. N-benzhydryl-O-methylpseudourea maleate.
8. N-benzhydryl-O-ethylpseudourea hydrochloride.
9. N-benzhydryl-O-isopropylpseudourea hydrochloride.

References Cited in the file of this patent

UNITED STATES PATENTS

| | | |
|---|---|---|
| 2,553,564 | Fein | May 22, 1951 |
| 2,686,203 | Hechenbleikner | Aug. 10, 1954 |
| 2,727,922 | Lecher | Dec. 20, 1955 |

OTHER REFERENCES

Rodd: "Chemistry of Carbon Compounds," vol. 1 part B (1952), page 917.

Migrdichian, "Chemistry of Organic Cyanogen Compounds," A.C.S. Monograph No. 105 (1947), page 103.